United States Patent [19]
McKeown et al.

[11] 3,914,351
[45] Oct. 21, 1975

[54] PACKED TOWER AND METHOD OF OPERATION

[75] Inventors: Kevin Joseph McKeown, New Castle; Stephen Robert Mercer Ellis; Ronald Priestley, both of Birmingham, all of England

[73] Assignee: Mass Transfer Limited, Westmoreland, England

[22] Filed: Mar. 2, 1973

[21] Appl. No.: 337,702

[52] U.S. Cl. .................................................. 261/98
[51] Int. Cl.² ............................................. B01F 3/04
[58] Field of Search ............... 261/DIG. 72, 94–98; 202/158; 55/233; 210/17, 23, 150, 151

[56] References Cited
UNITED STATES PATENTS

| | | | |
|---|---|---|---|
| 1,360,928 | 11/1920 | Goodwin | 261/95 |
| 1,947,777 | 2/1934 | Huff et al. | 261/94 |
| 2,055,162 | 9/1936 | Weber | 261/94 |
| 2,212,932 | 8/1940 | Fairlie | 261/94 |
| 3,167,600 | 1/1965 | Worman | 261/95 X |
| 3,233,660 | 2/1966 | Nettel et al. | 261/DIG. 72 |
| 3,266,787 | 8/1966 | Eckert | 261/94 |
| 3,365,180 | 1/1968 | Lerner | 261/DIG. 72 |
| 3,506,248 | 4/1970 | Starbuck et al. | 261/DIG. 72 |

FOREIGN PATENTS OR APPLICATIONS

| | | | |
|---|---|---|---|
| 907,289 | 3/1954 | Germany | 261/95 |
| 431,309 | 7/1935 | United Kingdom | 261/95 |
| 501,196 | 6/1930 | Germany | 261/94 |
| 374,707 | 6/1932 | United Kingdom | 261/94 |

OTHER PUBLICATIONS

German Publication Verfahrenstechnik, 3(1969)6, pp. 241–243, Kolev.

U.S. Stoneware, "Tower Packing" Bulletin TP54R, 1963.

Primary Examiner—Tim R. Miles
Attorney, Agent, or Firm—Wigman & Cohen

[57] ABSTRACT

A tower packing element comprises an open-ended tubular member having a diameter (as herein defined) greater than its width (as herein defined) in which the diameter of one end of the tubular member is greater than that of the other end thereof and which element has a plurality of radial ribs extending from the centre of the tubular member to the side walls thereof. The element may have straight or curved walls and be provided with two or more sets of ribs. The walls of the tubular member may be apertured. The invention also provides fluid-fluid contact apparatus packed with the elements of the invention.

14 Claims, 5 Drawing Figures

PACKED TOWER AND METHOD OF OPERATION

This invention is concerned with packing elements for use in fluid-fluid contact apparatus of the packed tower type and, more particularly, is concerned with an improvement in or modification of the invention which forms the subject matter of our co-pending application Ser. No. 209,969 filed Dec. 20, 1971, now abandoned in favor of continuation Ser. No. 445,961, filed Feb. 26, 1974.

Fluid-fluid contact apparatus of the packed tower type for effecting mutual gas (vapour)/liquid and liquid/liquid contact is well known.

Basically, fluid-fluid contact apparatus of the packed tower type comprises a tower or other structure containing one or more beds of packing elements and having means for introducing the fluids to be brought into contact with each other into said bed. In many applications, the fluids are brought into contact in countercurrent flow, the more dense fluid (i.e. the liquid in the case of gas(vapour)/liquid contact apparatus) flowing downwardly through the packed bed whilst the less dense fluid (i.e. the gas or vapour in the gas of gas(vapour)/liquid contact apparatus) flows upwardly through the bed. In other applications (e.g. cross-flow cooling towers) the fluids flows are generally at right angles to each other, for example with a liquid flowing downwardly through the bed whilst a gas or vapour flows across the bed. It is not that necessary that both fluids be forcibly fed to the bed and thus, for example, in the case of a so-called sewage filtration bed, liquid effluent is irrigated onto the surface of a packed bed through which air is allowed to permeate (usually without forced flow) to permit aerobic biological treatment of the effluent. The present invention is concerned with packing elements for all apparatus in which two different fluids are brought together in a packed bed for some action between them.

A wide variety of packing elements are known for such apparatus, for example, fabricated packages such as Raschig rings, Berl saddles, Intalox saddles and Pall rings. In the case of packing elements such as Raschig rings or Pall rings the beds may be stacked beds, (i.e. beds in which the element are individually placed in position) or dumped beds, (i.e. beds in which at least a portion of the elements have been dumped in situ in the apparatus). In the case of the saddles the beds will almost always be "dumped" beds.

In our co-pending application Ser. No. 209,969 we have described and claimed fluid-fluid contact apparatus comprising a packed bed and means for introducing fluids to said bed for contact therein in which at least a part of the bed is a dumped bed formed of packing members each comprising an open-ended tubular member, preferably of circular cross-section, the maximum transverse dimension of which in a plane perpendicular to its length ("diameter") is greater than the length of a right tube having the same cross-section as the tubular member and having the same surface area as the projected surface of the tubular member on a coaxial right tube of the same cross-section (its "width"), and which tubular element has one or more ribs or protrusions extending inwardly from the inside wall of the member.

It is an object of the present invention to provide an improved tower packing member of the type generally disclosed in our co-pending application Ser. No. 209,969 and which may be used in the fluid-fluid contact apparatus therein described and claimed.

Broadly, therefore, the present invention consists in a packing member comprising an open-ended tubular member having a diameter (as defined above) greater than its width (as defined above) in which the diameter of one end of the tubular member is greater than that of the other end thereof and which has a plurality of radial ribs extending from the centre of the tubular member to the side wall thereof.

In the following description reference will be made to the accompanying drawings illustrating packing elements in accordance with the invention, in which.

Figure 1:
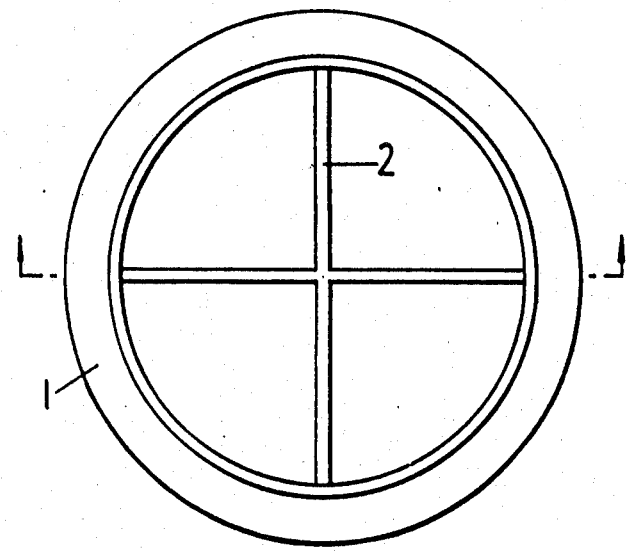
FIG. 1 is a plan view of a packing element in accordance with the invention.
Figure 2:
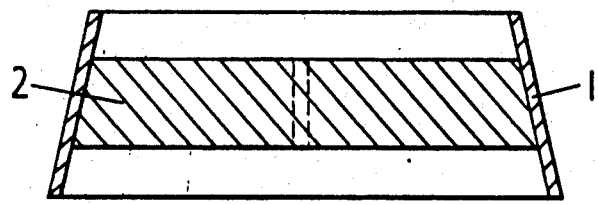
FIG. 2 is a diametric cross-section through a packing element in accordance with the invention having the plan view shown in FIG. 1 and having straight walls.

In the drawings the side walls of any tubular member are referred to by the numeral 1, internal radial ribs by the numeral 2, supplementary internal rings by the numeral 3, apertures in the side walls of the tubular member by the numeral 4 and external ribs by the numeral 5.

As clearly seen in the drawings, the overall length of each of the tubular members is equivalent to its width (as defined above), and thus the length of each tubular member is also less than its diameter (as defined above).

The tubular members forming the packing elements in accordance with the invention may have any desired cross-section as described in co-pending application Ser. No. 209,969 but are preferably circular in cross-section. The ratio of their diameter to their width is preferably more than 1.5 : 1 but less than 10 : 1, advantageously the ratio of their diameter to their width will be in the range 2 : 1 – 5 : 1 and, particularly, in the range 2 : 1 – 4 : 1.

In general, the ratio of the diameters of the two ends of the packing element is preferably such that the cone angle defined by the two ends is preferably less than 30°. In other words, the packing element of this invention is essentially in the form of a truncated cone, the longitudinal axis of which preferably defines an angle of not more than 30° at the hypothetical apex thereof with a line extending to any point on the periphery of its base.

Figure 3:
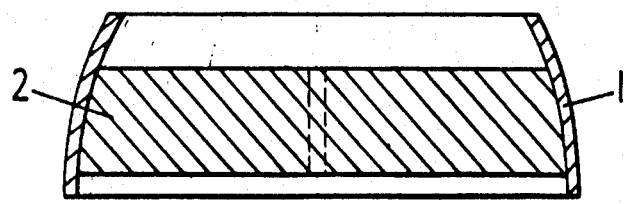
FIG. 3 is a diametric cross-section through a packing element in accordance with the invention having the plan view shown in FIG. 1 of the drawings and having salient curved side walls.
Figure 5:
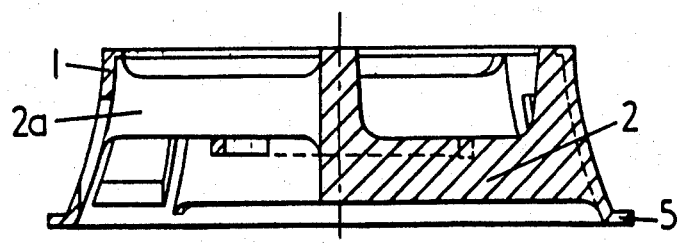
FIG. 5 is a diametric section on the line AA in FIG. 4.

The walls of the tubular element between the ends thereof may be straight (see FIG. 1) or curved and when they are curved they may be saliently curved, i.e. curve away from the centre of the tubular member (see FIG. 3), or may be re-entrantly curved, i.e. inwardly curved towards the centre of the tubular member, (see FIG. 5). Alternatively, the walls of the tubular member may be comprised of a series of straight elements forming a general curve.

In general, the internal radial ribs in the packing elements of the invention will be planar with the planes thereof parallel to the longitudinal axis of the tubular member and whilst these ribs may have a depth equal to the whole of the width of the tubular member they will preferably have a depth somewhat less than the width of the tubular member say about half the width of the tubular member. The ribs are preferably diametric so that there will be an even number of radial ribs in the member and, thus, there may be four (see FIG. 1), six (see FIG. 4) or more radial ribs in the packing element, the number of ribs generally increasing with increasing diameter of the packing element. The packing element may, further, be provided with two or more sets of ribs at different levels angularly staggered with respect to each other (see FIGS. 4 and 5), in this case the upper set of ribs will preferably bisect the angles formed between the lower set of ribs. Again, it will generally be desirable to have more than one set of ribs as the size and diameter of the tubular member increases and, also, where the ribs are provided in a number of layers they will generally have a lesser depth than ribs provided in only one layer and may, for example, have a depth of from one quarter to one third of the width of the tubular member. The outer surface of the walls of the tubular member may also be provided with ribs which may be circumferential strengthening ribs (see FIG. 5) or may be external extensions of the internal radial ribs.

Figure 4:
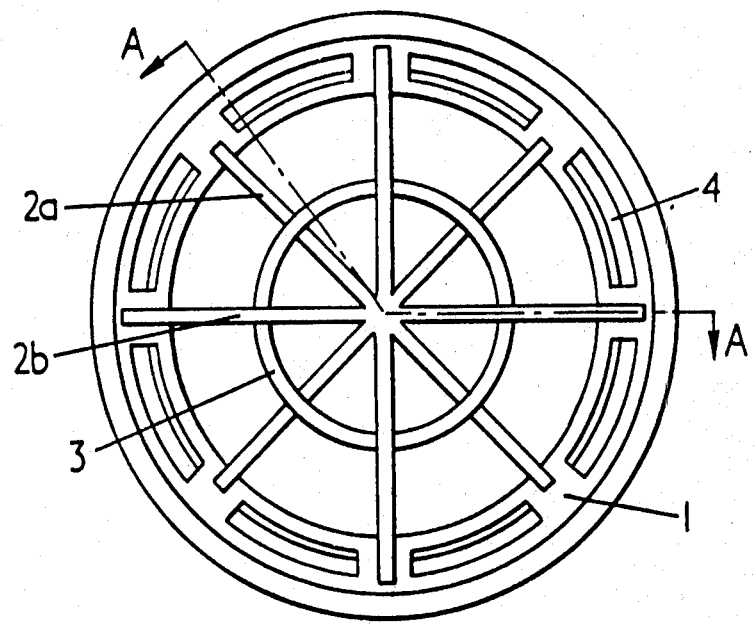
FIG. 4 is a plan view of a preferred element in accordance with the invention.

The walls of the packing elements of the invention are, desirably, apertured, especially in the case of the larger sizes of packing elements (see FIGS. 4 and 5). These apertures may be provided as a single row of apertures or, in the case of the larger packing elements, as two or more rows of apertures. The shape of the apertures may vary, as desired and thus, for example, the apertures may be circular, oblong, square or rectangular in shape.

The packing elements may also be provided with subsidiary inner rings joining the internal radial ribs which rings will serve not only to strengthen the element but also serve to break up the flow of gas and/or liquid therethrough to provide and promote desirable turbulence.

The packing elements in accordance with the invention will, as described in our co-pending application Ser. No. 209,969, tend to orient themselves, when dumped in fluid-fluid contact apparatus, in a generally horizontally fashion and will, in general, demonstrate an increased capacity and reduce the pressure drop as compared with conventional tower packing elements.

The packing elements of the invention are particularly adapted for manufacture from plastics materials by an injection moulding process and any suitable plastics material may be employed provided, of course, that it is chemically resistant to the materials with which it will come into contact in operation. In particular, the packing elements of the invention may be formed of polypropylene or glass-filled polypropylene.

The present invention also provides fluid-fluid contact apparatus comprising a packed bed and means for introducing fluids to said bed for contact therein in which at least a part of the bed is formed of the packing members in accordance with the invention. In such apparatus the ratio of the diameter of the packing elements to that of the bed is conveniently 1 : 3 or more.

The fluid-fluid contact apparatus of the invention may take any of the forms in which packed beds of elements are utilized to effect fluid-fluid contact; for example may take the form of distillation, absorbtion, desorbtion, water-cooling, biological treatment (e.g. effluent "filtration"), gas-scrubbing, gas-humidification, liquid-liquid extraction apparatus or general microbiological wash apparatus or combinations thereof.

The bed (s) of packing elements within the apparatus may simply be prepared by dumping the elements into the bed. Where the apparatus is of the cross-flow type it may be advisable to turn the elements in the bed through 90° and this may be achieved by physically turning the bed on a suitable support or by flooding the apparatus.

The invention also provides a method of contacting a fluid with another fluid which comprises bringing the fluids into contact in an apparatus according to the invention.

We claim:

1. Fluid-fluid contact apparatus comprising a packed bed and means for introducing fluids to said bed for contact therein in which at least a part of said bed is a dumped bed formed of a plurality of packing elements each including a tubular member terminating in opposite ends, each of said ends having a diameter to width ratio greater than 1.5:1 and in which the diameter of one end of the tubular member is greater than that of the other end thereof, said element having a plurality of radial ribs extending from the centre of the tubular member to the side wall thereof, and wherein said ribs do not extend beyond the ends of said tubular member.

2. Fluid-fluid contact apparatus according to claim 1 in which the ratio of any diameter of the tubular member to the width thereof is from greater than 1.5 : 1 to 10 : 1.

3. Fluid-fluid contact apparatus according to claim 2 in which the said ratio is from about 2 : 1 to about 5 : 1.

4. Fluid-fluid contact apparatus according to claim 1 in which the ratio of the diameters of the two ends of the tubular member is such that the cone angle defined by the two ends is less than 30°.

5. Fluid-fluid contact apparatus according to claim 1 in which the walls of the tubular member are curved between the ends thereof.

6. Fluid-fluid contact apparatus according to claim 5 in which the walls of the tubular member are saliently curved between the ends thereof.

7. Fluid-fluid contact apparatus according to claim 5 in which the walls of the tubular member are re-entrantly curved between the ends thereof.

8. Fluid-fluid contact apparatus according to claim 1 in which the ribs are diametric ribs.

9. Fluid-fluid contact apparatus according to claim 1 in which the ribs are planar ribs with the planes thereof parallel to the longitudinal axis of the tubular member.

10. Fluid-fluid contact apparatus according to claim 1 having at least two sets of ribs at different levels and angularly staggered with respect to each other.

11. Fluid-fluid contact apparatus according to claim 1 in which the walls of the tubular element are apertured.

12. Fluid-fluid contact apparatus according to claim 1 having at least one internal subsidiary ring joining the internal radial ribs.

13. A method of contacting a fluid with another fluid which comprises bringing the fluids into contact in apparatus according to claim 1.

14. Fluid-fluid contact apparatus comprising a packed bed and means for introducing fluids to said bed for contact therein in which at least a part of said bed is a dumped bed formed of a plurality of packing elements each including a tubular member terminating in upper and lower open ends, each of said ends having a diameter at least 1.5 times greater than the width of said member and wherein the diameter of said lower end is greater than the diameter of said upper end, said elements having a plurality of radial ribs extending from the center of the tubular member to the side wall thereof, the overall length of said tubular member being less than its least diametrical dimension, and wherein said aforementioned relationships between said diameters and width tend to facilitate a generally horizontal orientation of a large percentage of said members with the lower ends thereof disposed downwardly when randomly dumped into said bed, said radial ribs further tending to prevent nesting of said elements during such random dumping.

* * * * *